(12) United States Patent
Braun

(10) Patent No.: US 9,722,721 B2
(45) Date of Patent: Aug. 1, 2017

(54) METHOD AND DEVICE FOR TRANSPARENT CONNECTION OF DIFFERENT DWDM SYSTEMS BY NXN AWGS

(71) Applicant: Deutsche Telekom AG, Bonn (DE)

(72) Inventor: Ralf-Peter Braun, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/943,098

(22) Filed: Nov. 17, 2015

(65) Prior Publication Data

US 2016/0142170 A1    May 19, 2016

(30) Foreign Application Priority Data

Nov. 17, 2014  (EP) .................................... 14193433

(51) Int. Cl.
*H04J 14/02*   (2006.01)
*G02B 6/12*    (2006.01)
*G02B 6/293*   (2006.01)

(52) U.S. Cl.
CPC .......... *H04J 14/02* (2013.01); *G02B 6/12019* (2013.01); *G02B 6/2938* (2013.01); *H04J 14/0201* (2013.01); *H04J 14/0275* (2013.01); *H04J 14/0282* (2013.01); *H04J 14/0221* (2013.01)

(58) Field of Classification Search
CPC .... H04J 14/02; H04J 14/0201; H04J 14/0275; H04J 14/0282; H04J 14/0221; H04B 10/2972; G02B 6/2938; G02B 6/12019
USPC .......................................................... 398/87
See application file for complete search history.

(56) References Cited

U.S. PATENT DOCUMENTS

| | | | |
|---|---|---|---|
| 6,433,903 B1 * | 8/2002 | Barry ................. | H04B 10/0731 398/79 |
| 7,199,921 B2 * | 4/2007 | Kaspit .................... | F01D 5/188 359/333 |
| 7,298,974 B2 * | 11/2007 | Tanobe ............... | H04J 14/0227 398/49 |
| 2003/0185488 A1 * | 10/2003 | Blumenthal ....... | H04Q 11/0005 385/16 |
| 2004/0175187 A1 * | 9/2004 | Eiselt ................. | H04B 10/2971 398/173 |
| 2004/0208542 A1 * | 10/2004 | Peddanarap- pagari ................ | H04J 14/0212 398/45 |
| 2016/0036552 A1 * | 2/2016 | Li ....................... | H04J 14/0265 398/49 |

* cited by examiner

*Primary Examiner* — Dalzid Singh
(74) *Attorney, Agent, or Firm* — Leydig, Voit & Mayer, Ltd.

(57) ABSTRACT

A system for connecting two or more dense wavelength division multiplex (DWDM) systems in an optically transparent manner includes a first DWDM system with a first optical line amplifier (OLA) for amplifying the signal to be transmitted and a second DWDM system which has a second OLA for amplifying the signal to be transmitted. The first OLA and the second OLA are connected to each other via a passive N×N AWG, arrayed waveguide grating.

16 Claims, 11 Drawing Sheets

| B# → | P0 | 1 | 2 | 3 | 4 | 5 | 6 | 7 | 8 | 9 | 10 | 11 | 12 |
|---|---|---|---|---|---|---|---|---|---|---|---|---|---|
| Pi | 1 | 1 | 2 | 3 | 4 | 5 | 6 | 7 | 8 | 9 | 10 | 11 | 12 |
| ↓ | 2 | 2 | 3 | 4 | 5 | 6 | 7 | 8 | 9 | 10 | 11 | 12 | 1 |
| | 3 | 3 | 4 | 5 | 6 | 7 | 8 | 9 | 10 | 11 | 12 | 1 | 2 |
| | 4 | 4 | 5 | 6 | 7 | 8 | 9 | 10 | 11 | 12 | 1 | 2 | 3 |
| | 5 | 5 | 6 | 7 | 8 | 9 | 10 | 11 | 12 | 1 | 2 | 3 | 4 |
| | 6 | 6 | 7 | 8 | 9 | 10 | 11 | 12 | 1 | 2 | 3 | 4 | 5 |
| | 7 | 7 | 8 | 9 | 10 | 11 | 12 | 1 | 2 | 3 | 4 | 5 | 6 |
| | 8 | 8 | 9 | 10 | 11 | 12 | 1 | 2 | 3 | 4 | 5 | 6 | 7 |
| | 9 | 9 | 10 | 11 | 12 | 1 | 2 | 3 | 4 | 5 | 6 | 7 | 8 |
| | 10 | 10 | 11 | 12 | 1 | 2 | 3 | 4 | 5 | 6 | 7 | 8 | 9 |
| | 11 | 11 | 12 | 1 | 2 | 3 | 4 | 5 | 6 | 7 | 8 | 9 | 10 |
| | 12 | 12 | 1 | 2 | 3 | 4 | 5 | 6 | 7 | 8 | 9 | 10 | 11 |

| Pi | 1 | V#1 | | #oP 12 | Pi | 7 | V#2 | | |
|---|---|---|---|---|---|---|---|---|---|
| Po | 1 | Intra | | | Po | 7 | Intra | | |

| Pi | B# | Po | --> | P1 | Po | Pi | B# | Po | --> | P1 | Po |
|---|---|---|---|---|---|---|---|---|---|---|---|
| 1 | 1 | 1 | --> | 1 | 1 | 7 | 1 | 7 | --> | 7 | 7 |
| 1 | 2 | 2 | --> | 12 | 1 | 7 | 2 | 8 | --> | 6 | 7 |
| 1 | 3 | 3 | --> | 11 | 1 | 7 | 3 | 9 | --> | 5 | 7 |
| 1 | 4 | 4 | --> | 10 | 1 | 7 | 4 | 10 | --> | 4 | 7 |
| 1 | 5 | 5 | --> | 9 | 1 | 7 | 5 | 11 | --> | 3 | 7 |
| 1 | 6 | 6 | --> | 8 | 1 | 7 | 6 | 12 | --> | 2 | 7 |
| 1 | 7 | 7 | --> | 7 | 1 | 7 | 7 | 1 | --> | 1 | 7 |
| 1 | 8 | 8 | --> | 6 | 1 | 7 | 8 | 2 | --> | 12 | 7 |
| 1 | 9 | 9 | --> | 5 | 1 | 7 | 9 | 3 | --> | 11 | 7 |
| 1 | 10 | 10 | --> | 4 | 1 | 7 | 10 | 4 | --> | 10 | 7 |
| 1 | 11 | 11 | --> | 3 | 1 | 7 | 11 | 5 | --> | 9 | 7 |
| 1 | 12 | 12 | --> | 2 | 1 | 7 | 12 | 6 | --> | 8 | 7 |

Fig. 6

METHOD AND DEVICE FOR TRANSPARENT CONNECTION OF DIFFERENT DWDM SYSTEMS BY NXN AWGS

CROSS-REFERENCE TO RELATED APPLICATIONS

Priority is claimed to European Patent Application No. 14 193 433.1, filed on Nov. 17, 2014, the entire disclosure of which is hereby incorporated by reference herein.

FIELD

The present invention relates to a system and a method for transparent connection of different DWDM systems, in particular also DWDM systems of different vendors, by N×N AWGs.

BACKGROUND

In optical transport networks according to the ITU-T G.709 standard "optical transport network (OTN)" (http://www.itu.int/rec/T-REC-G.709/), optical multiplex signals are transmitted with optical frequencies or wavelengths according to the ITU-T G.694.1 standard "DWDM frequency grid" (http://www.itu.int/rec/T-REC-G.694.1/) (dense wavelength division multiplex, DWDM). The optical transport network (OTN) is a technology standardized by the ITU in the standard G.709 for a telecommunication network by means of which network providers transmit user data by means of a transport service. The architecture of the optical transport network can generally be divided into three optical layers. The lowermost layer, the optical transmission section (OTS), describes the optical fiber path between two optical system components. These can be optical amplifiers (OA), optical add drop multiplexers (OADM) or optical crossconnects (OXC). The layer thereon, the optical multiplex section (OMS), comprises the multiplex functions of a DWDM connection between two network nodes. The uppermost layer, the optical channel layer (OCh), describes the optical channel between two optical terminal points. In such a channel, any user data can be transmitted. Standardized adaptation functions allow the transmission of Ethernet and IP frames without previous PHD or SHD framing.

Presently available DWDM systems with 96 DWDM channels with 50 GHz channel bandwidth per channel can transmit 100 Gbit/s signals over >3000 km in the optical C band (center band) (http://www.cisco.com/en/US/prod/collateral/optical/ps5724/ps2006/data_sheetc78-713296.html).

The C band is substantially determined by the optical amplification bandwidth of the optical erbium doped fiber amplifiers (EFDA). These DWDM systems can comprise, in addition to the optical band and channel multiplexers and demultiplexers and the optical amplifiers, also reconfigurable optical add drop multiplexers (ROADM), so that comprehensive and complex meshed glass fiber networks can be set up.

So far, only DWDM systems of one vendor are used for setting up an optical network because the different complex functions and controlling processes must be controlled within the DWDM network via vendor-pure DWDM technology by means of corresponding management systems, which are mostly vendor-specific. A connection of different DWDM systems of different vendors, i.e. the connection of different DWDM systems to different management systems, has so far not been intended.

Therefore, there is the need for providing new methods and systems for optical transport networks, in particular for connecting different DWDM systems to different management systems.

SUMMARY

An aspect of the invention provides a system, comprising: a first dense wavelength division multiplex (DWDM) system; and a second DWDM system, wherein the first DWDM system and the second DWDM system are connected in an optically transparent manner, wherein the first DWDM system includes a first optical line amplifier (OLA) configured to amplify a signal to be transmitted, wherein the second DWDM system includes a second OLA configured to amplify a signal to be transmitted, wherein the first OLA and the second OLA are connected with each other via a passive N×N arrayed waveguide grating (AWG).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows a matrix for connecting a passive optical frequency or wavelength-addressed 400 GHz channel bands of the C band with channel numbers B# from the input ports Pi to the output ports Po of the AWG;

FIG. 4 shows tables for an exemplary connection scheme for up to 12 DWDM systems for one direction;

FIG. 6 shows a table for the exemplary connection of two DWDM systems to respective AWG ports 1 and 7 of a 12×12 AWG;

DETAILED DESCRIPTION

Figure 1:
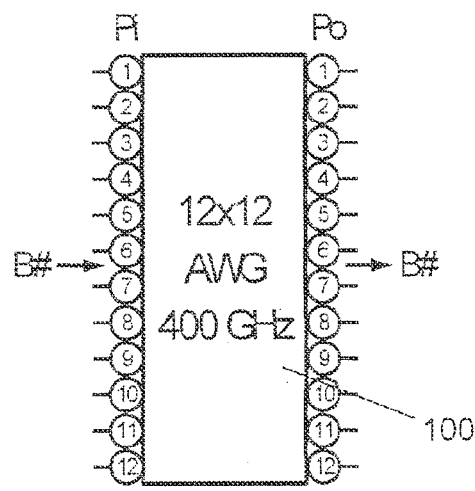
FIG. 1 shows an N×N AWG with 12 ports.

The systems and methods according to the invention allow the optically transparent connection of different DWDM systems, in particular also from different vendors, wherein the individual DWDM systems can still be controlled separately and independently of one another by means of their vendor-specific management systems while their respective functions are nevertheless maintained.

According to a first aspect, the invention relates to a system comprising a first DWDM (dense wavelength division multiplex) system and a second DWDM system which are connected with each other in an optically transparent manner. Preferably, the first DWDM system comprises a first OLA, optical line amplifier, for amplifying the signal to be transmitted, and the second DWDM system comprises a second OLA for amplifying the signal to be transmitted. Preferably, this first OLA of the first DWDM system is connected to the second OLA of the second DWDM system by means of a passive N×N AWG, arrayed waveguide grating.

For transmitting the signals of the first DWDM system over wide paths, the first DWDM system preferably comprises a plurality of OLAs. This preferably also applies to the second DWDM system. According to the invention, a first OLA is preferably any OLA in the first DWDM system. In other words, a first OLA is an OLA of the first system. Accordingly, the second OLA is an OLA of the second system.

In particular, according to the invention preferably an N×N AWG is used for a unidirectional signal transmission, and for a bidirectional signal transmission preferably two N×N AWGs are used. In other words, preferably one N×N AWG is used per transmission direction.

Preferably, an OLA of the first system comprises a first signal input and a first signal output. The OLA is moreover preferably configured such that a first optical supervisory channel, OSC, is decoupled from a (first) content signal downstream of the first signal input. Preferably, the optical supervisory channel transmits OSC management signals. The decoupled OSC management signals are preferably converted in the OLA into electrical signals and preferably processed as electrical signals within the OLA. Preferably, the OSC management signals are also terminated and processed in a ROADM (reconfigurable optical add drop multiplexer as component in optical long-distance transport networks) or OXC (optical crossconnect, also OCC) and in the line terminal (optical terminal points of the optical connection).

The decoupled content signal is preferably maintained as optical signal or optically transmitted by the OLA. The first content signal is preferably a DWDM content multiplex signal which comprises, e.g., 96×50 GHz channels in the C band. This division is an example of the C band. However, the invention is not restricted thereto, and there can also be other signals, e.g., 12×400 GHz bands, or also mixed signals. In the example with the 12×12 AWG, 12×400 GHz bands are connected in the AWG or transmitted transparently because of their wavelengths. It does not matter to the optical functioning of the AWGs whether there are 8×50 GHz channels per band or 1×1 GHz channels or 16×25 GHz channels or also mixed channels (e.g., flex grid). Preferably, upstream of the first signal output of the OLA, the OSC is again coupled to a content signal. For this purpose, the OSC signal, which is processed as electrical signal, is preferably again converted into optical signals. The content signal is preferably a DWDM content multiplex signal which can in turn comprise, e.g., 96×50 channels in the C band but is preferably partly changed in view of the input signal.

This accordingly applies to the second DWDM system, i.e. the second OLA preferably comprises a second signal input and a second signal output, which is configured such that a second optical supervisory channel, OSC, with second management signals is decoupled from a (second) content signal downstream of the second signal input and is coupled to a content signal upstream of the second signal output. The term "second" should in turn not indicate that a second signal input of the OLA is meant but the signal input of the OLA of the second system. Preferably, the AWG is connected such to the first and the second OLA that the content signal or the first and second content signals, and preferably not the first and the second optical supervisory channel, is/are transmitted to the inputs (Pi) of the N×N AWGs, wherein content signals of outputs (Po) of the N×N AWGs are transmitted to the first and second OLAs, and the content signals in the first and the second OLA are coupled to the corresponding optical supervisory channel, OSC, upstream of the respective signal output.

The first and/or the second OLA is preferably a two-step amplifier or preferably comprises two amplifiers which are configured such that a first amplifier in the first or second OLA amplifies the content signal before transmission to the N×N AWG and a second amplifier in the first or second OLA amplifies after receipt of the content signal from the N×N AWG and before coupling with the optical supervisory channel, OSC. According to a further preferred embodiment, also one-step OLA amplifiers can be used. In particular, this is advantageous if the OLA is the "last" OLA of a system, i.e. if it is no longer necessary to transmit the signals within the same system in an amplified manner downstream of the OLA.

Preferably, the first management signals of the first optical supervisory channel, OSC, differ from the second management signals of the second optical supervisory channel, OSC. This is in particular the case if the two DWDM systems are systems of different vendors. In other words, this is preferably the case if the first management signals are first proprietary signals (of a first vendor) which differ from second proprietary signals of the second management signals, so that the first DWDM system and the second DWDM system belong to different management systems.

Preferably, the number N in the N×N AWG is a natural number and designates the number of ports of the AWG. For example, N can be a natural number from the following set: 1, 2, 3, 4, 5, 6, 7, 8, 9, 10, 11, 12, 24, 48, 96, 192, 384 or even >1000. For example, in a 12×12 AWG, a bandwidth of 400 GHz is transmitted per AWG band in a 4800 GHz wide C band. In another example, in a 96×96 AWG, a bandwidth of 50 GHz is transmitted per AWG in a 4800 GHz wide C band. In a further example, in a 192×192 AWG, a bandwidth of 25 GHz is transmitted per AWG band in a 4800 GHz wide C band.

Moreover, in accordance with the invention it is possible to connect not only two systems to an N×N AWG but up to N systems, wherein N is in turn a natural number selected from the set of N=1, 2, 3, 4, 5, 6, 7, 8, 9, 10, 11, 12, 24, 48, 96, 192, 384 or even >1000. For example, up to N DWDM systems can accordingly be connected in an optically transparent manner via the N×N ports of the AWG.

In other words: Although in the examples N×N AWGs are shown with N=12, the number N of the AWG ports is not restricted to 12 in accordance with the invention. In particular, this preferred number 12 comes from the example of the slightly broadened C band with 4800 GHz bandwidth. This can be divided, e.g., in 12×400 GHz. However, also a division in other blocks, e.g., 96×50 GHz or 192×25 GHz, etc. is possible. Moreover, also non-even numbers can be used, e.g. N=37 and/or it is not urgently necessary that the maximum bandwidth of 4800 GHz is met in the C band.

Furthermore, the maximum number of the coupled systems depends on whether the individual content channels should be continued via one or two AWGs.

Figure 5:
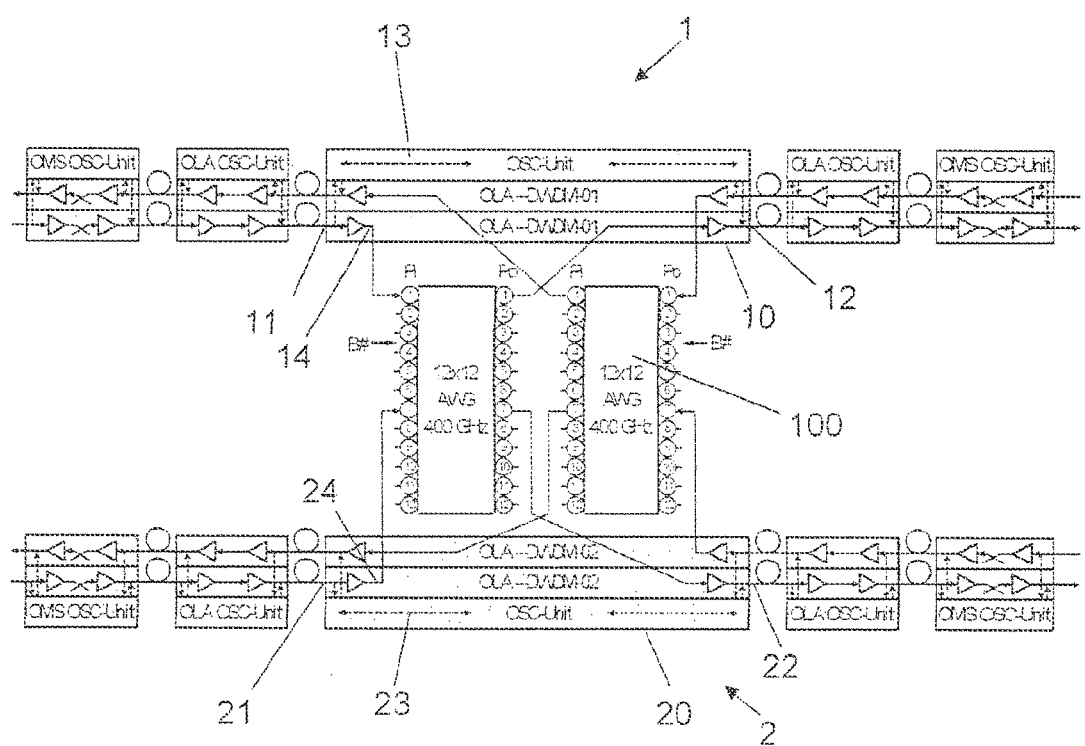
FIG. 5 shows a further embodiment according to the present invention for connecting two DWDM systems for a bidirectional transmission direction.

In case of a bidirectional transmission with two AWGs and continuation of all management channels, N systems can be coupled to each other (see, e.g., FIG. 5).

In case of a bidirectional transmission with one single AWG and continuation of all management channels, N/2 systems can be coupled to each other.

In case of a bidirectional transmission with two AWGs and without continuation of all management channels, 2×N systems can be coupled to each other.

Moreover, also mixed forms are possible, i.e. it is possible to couple a maximum of up to 24 systems with two 12×12 AWGs.

The N×N AWG preferably allows a wavelength-addressed connection of the DWDM systems.

For a bidirectional signal transmission, the first DWDM system is preferably connected in an optically transparent manner to the second DWDM system via two passive N×N AWGs.

Moreover, the connection principles described in more detail in the following detailed description are preferred. For example, the specific connection principle of the AWGs according to FIGS. 4 and 6, by means of which the wavelength-dependent coupling of the system can be controlled, is preferred.

According to a further preferred embodiment, it is possible to use also only one single 12×12 AWG for a bidirectional connection, e.g. for two systems, wherein the number of the transmittable 400 GHz DWDM bands is accordingly reduced in the C band. This is achieved, e.g., on the basis of FIG. 6 as follows:

System 1 with transmission direction to the right is coupled in Pin1 and decoupled via Pout12 (FIG. 6, top, first from the left). System 1 with transmission direction to the left is coupled in Pin2 and decoupled via Pout11 (FIG. 6, top, second from the left).

System 2 with transmission direction to the right is coupled in Pin3 and decoupled via Pout10 (FIG. 6, top, third from the left). System 2 with transmission direction to the left is coupled in Pin4 and decoupled via Pout9 (FIG. 6, top, fourth from the left).

Thus, the input ports Pin1 to Pin4 and the output ports Pout9 to Pout12 are occupied by systems 1 and 2.

The optical connection of the other ports by means of glass fiber patch cables is preferably realized in accordance with FIG. 6 and results in Pout1 to Pin12, Pout2 to Pin11, Pout3 to Pin10, Pout4 to Pin9, Pout5 to Pin8, Pout6 to Pin7, Pout7 to Pin6 and Pout8 to Pin5. Thus, preferably specific but not all corresponding channels can be overcoupled between the systems 1 and 2. Preferably, further systems 3 to 6 can be coupled bidirectionally, wherein the number of overcoupled bands is accordingly reduced.

The present invention also relates to a method for expanding a system according to the invention, e.g., as mentioned above, as claimed in the claims or as described in the detailed description.

In particular, the present invention relates to a method for connecting a first DWDM, dense wavelength division multiplex, system to a second DWDM system in an optically transparent manner, wherein the first DWDM system comprises a first OLA, optical line amplifier, for amplifying the signal to be transmitted, and wherein the second DWDM system comprises a second OLA, optical line amplifier, for amplifying the signal to be transmitted. Preferably, the first OLA is connected to the second OLA via a passive N×N AWG, arrayed waveguide grating.

According to a further alternative embodiment, also the optical input amplifier or also the optical output amplifier can be omitted if the upstream or downstream transmission lengths are short, i.e. if no extensive path dampening is present, e.g., if they are smaller than 5 dB. This corresponds, e.g., to a transmission length of approx. up to 20 km. The decoupling and the coupling of the OSC channel, however, is preferably carried out similarly to the two-step amplifier. According to a further preferred embodiment, it is also possible to connect two or more systems by guiding the OSC channels up to the AWG and then terminating them, i.e. the OSC channels are terminated in their system-specific optical amplifiers. The DWDM content multiplex signals are then continued on a different system whose OSC channel was also terminated in its system-specific optical amplifier. In this case, no AWG is necessary for the coupling of two systems (unidirectional, upper system transmission) because the OLAs at the left side are assigned to system 1 and the OLAs at the right side of the AWG are assigned to system 2. Bidirectionally, the counter-direction can also do without AWG. When connecting three or more systems, an AWG again makes sense and is necessary for the optically transparent wavelength-wise connection, wherein the connection can be realized unidirectionally with one AWG per direction or also bidirectionally with only one AWG but with a reduced number of coupled bands.

FIG. 1 exemplarily shows an N×N AWG 100 with, e.g., N=12 ports and a bandwidth of the bands of 400 GHz. On each port, the entire C band can be guided with 12×400 GHz=4800 GHz. B# designates the band numbers of the optical 400 GHz bands with B#=1, 2, . . . , 12, Pi designates the input ports and Po designates the output ports. For example, the input ports and/or output ports are glass fiber input ports and/or output ports.

Figure 2:
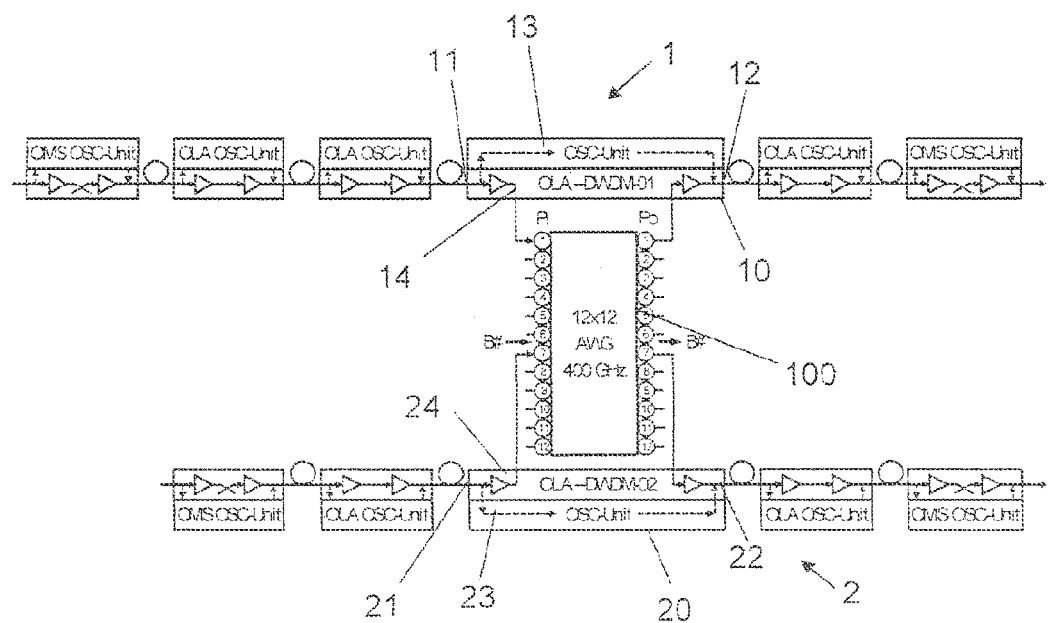
FIG. 2 shows a first embodiment according to the present invention for connecting two DWDM systems for a unidirectional transmission direction.

FIG. 2 shows a first embodiment for connecting two DWDM systems. For the optically transparent connection of different DWDM systems according to the invention, e.g. DWDM-01 (reference number 1) and DWDM-02 (reference number 2), for example a passive optical N×N AWG (arrayed waveguide grating) component 100 is connected between the two connector steps 10 and 20 of an optical connector of the respective DWDM-01 and DWDM-02 system to the respective input and output ports for one direction.

According to the invention, preferably an N×N AWG (arrayed waveguide grating) component 100, e.g., a 12×12 AWG with 400 GHz for the frequency channel bandwidths according to FIG. 1 is used for the connection of DWDM systems. However, it is also possible to use other numbers of ports with accordingly other frequency channel bandwidths.

FIG. 2 exemplarily shows the connection of two (e.g., also different) DWDM systems 1 and 2 via, e.g., a 12×12 port AWG 100 for one transmission direction (unidirectional transmission). The counter-direction can accordingly be connected to a second, preferably equal N×N AWG (see, e.g., FIG. 5, further below). However, the present invention is not restricted to the connection of two DWDM systems. Rather, it is also possible to connect more than two DWDM systems. For the connection shown in FIG. 2, for example the input and output ports 1 and 7 of the AWG are used, wherein also other combinations can be used.

By connecting the AWG ports between the two steps of the respective optical line amplifiers (OLAs) 10, 20 of the different DWDM systems 1, 2, preferably in the middle between the two steps, the respective optical supervisory channels (OSCs) 13, 23 and their guided management signals are decoupled and coupled without the connections to the AWG 100 disturbing the individual management signal flows 13, 23. Thus, the point-to-point DWDM paths between corresponding OMS terminals (optical multiplex section, OMS) remain preferably undisturbed, i.e. the multiplex function of a DWDM connection between two network nodes remains preferably undisturbed. While the optical OLAs are located between the nodes of the optical network on the connection paths in order to compensate for the optical dampening of the fibers, the OMS sections are terminated in the network nodes. Thus, e.g., the different management systems in the individual DWDM systems remain undisturbed from each other and can manage the respective vendor-specific OTS sections (optical transport sections—between DWDM amplifiers and/or nodes) and OMS sections (optical multiplex sections—between DWDM nodes).

For example, the DWDM system 1 shown at the top of FIG. 2 comprises the six shown OLAs and the DWDM system 2 shown at the bottom comprises the five shown OLAs. However, it is pointed out that to the right and to the left, as shown by the lines, of course further OLAs can be present for amplifying the optical signals in the DWDM system. The optical glass fibers between the OLAs are shown, e.g., as loops. If an optical signals is fed from a glass fiber into an OLA at the input 11 (or 21) of the OLA, according to the invention the signal is split into management signals, which are transmitted via an optical supervisory channel, OSC, and content signals, i.e. the actual data to be transmitted. The management signals of the OSC are preferably transmitted or processed within the OLA. Preferably, the OSC management signals do not leave the OLA (see OSC unit). For example, this is advantageous in that the management signals can be transmitted easily and are used in accordance with the specific requirements of the respective DWDM system.

The content signals, which can preferably be split from the management signals by the OLA, can be transmitted to the other DWDM system. According to the invention, preferably OLAs comprising two amplifiers (2-step OLAs) are used, i.e. the content signal split off in the OLA can first be amplified by the first amplifier (see the first triangle in the OLA). Then, the amplified content signal 14 can leave the OLA 10 and can be transmitted to the AWG 100.

Content signals from the AWG, i.e. signals from the own DWDM system or an alien system are fed into the OLA and are first amplified by the second amplifier (see the second triangle in the OLA) and then coupled with the management signals. These coupled signals are then transmitted to the output 10 of the OLA and transmitted there in the DWDM system.

The use of the N×N AWGs is advantageous in that a plurality of DWDM systems can be easily connected to each other. In other words, because of the functioning of the, e.g., 12×12 AWGs according to the invention with respective 400 GHz wavelength bands or 50 GHz wavelength channels, the transmission signals of the DWDM systems on the DWDM channels are guided from the input ports to corresponding output ports in accordance with the passive optical filtering functions of the AWGs.

For a 12×12 AWG with 400 GHz bands, the passive optical frequency or wavelength-addressed connection of the 400 GHz channel bands with the band numbers B# from the input ports Pi to the output ports Po of the AWGs is shown in FIG. 3.

Corresponding equations for calculating the interdependency of the values Po, Pi and B# are shown in the following in [1]. For example, the 400 GHz band B#=2 is guided at the input port Pi=2 to the output port Po=3 (see double arrows in FIG. 3).

$$Po = \text{Mod}\left\{\frac{(Pi-1) + (B\#-1)}{12}\right\} + 1 \quad [1]$$

$$Pi = \text{Mod}\left\{\frac{Po - B\#}{12}\right\} + 1$$

$$B\# = \text{Mod}\left\{\frac{Po - Pi}{12}\right\} + 1$$

If the 400 GHz band channels are further divided by, e.g., further 1×8 demultiplexers or 8×1 multiplexers with 50 GHz channel bandwidths with corresponding channel numbers ch#, ch#=1, 2, . . . , 96, the 400 GHz band numbers B# and the 50 GHz sub-channel numbers Subch# are calculated in accordance with equation [2]. For example, the 50 GHz channel ch#=13 is guided in the 400 GHz band B#=2 as well as in the 50 GHz sub-channel Subch#=5.

$$B\# = \text{Roundup}\left(\frac{ch\#}{8}; 0\right) \quad [2]$$

$$Subch\# = \text{Mod}\left\{\frac{ch\# - 1}{8}\right\} + 1$$

In the following, a method for connecting two DWDM systems is described in more detail. For example, in accordance with the invention, two DWDM systems can be connected even if the respective management signals of the two DWDM systems differ from each other. For example, different vendors use their own, preferably proprietary management signals. According to the invention, however, it becomes possible to combine also DWDM systems which use different (e.g., proprietary) management signals. For the sake of clarity it is assumed in the following that two DWDM systems of two different vendors are connected. However, it is obvious to the person skilled in the art that the underlying technical feature thereof is not the "vendor" but the different management signals which are preferably used by different vendors.

For connecting different DWDM vendor systems, the following principle should be used as a basis for a possible optimization aim of guiding DWDM channels in the own (vendor) DWDM system in order to maximize the capacity of the arrangement, i.e. the number of possible wavelength channels. Other optimization aims are also possible, e.g., the maximum overcoupling of DWDM channels in DWDM systems of other vendors, or also the combination of both, or in accordance with a predetermined metric.

1. First, the input port Pi of the N×N AWG is selected for the first vendor V01. For example, the input port $P_{in01}$ is randomly selected. Thus, input port $P_{in01}$ is occupied.

2. Then, the output port Po of the N×N AWG is selected for the first vendor V01. For example, the output port $P_{out12}$ is randomly selected. Thus, the output port $P_{out12}$ is occupied (see FIG. 4, partial table at the top left).

3. Then, intra glass fiber connections, which are switched between the respective output and input ports of the AWG, are calculated in accordance with equation [3] and respective free AWG ports are connected by intra glass fiber connections.

The optimization aim is the guidance of DWDM channels in the own DWDM system. For example, for $P_{in,V01}=1$, $P_{out,V01}=12$, #AWG_ports=12 and the band B#=1, an intra glass fiber connection between $P_{in,intra}=12$ and $P_{out,intra}=1$ is obtained. Further intra glass fiber connections are shown in [3] for accordingly free channel bands B#=1, 2, ..., N=12 for the AWG input and output ports.

$$P_{in,intra} = \text{Mod}\left\{\frac{P_{out,V01} - B\#}{\#AWG\_ports}\right\} + 1 \quad [3]$$

$$P_{out,intra} = \text{Mod}\left\{\frac{P_{in,V01} - 1 + B\# - 1}{\#AWG\_ports}\right\} + 1$$

4. Then, e.g., further DWDM systems can be connected, e.g., by further vendors V02, V03, ... in that the AWG input port $P_{in,V02}$, $P_{in,V03}$, ... is selected for the next vendor V02, V03, .... The corresponding intra glass fiber connection is cancelled for this purpose. For example, in FIG. 4 the input port Pi2 is used for the second vendor V02.

5. Then, the corresponding AWG output port $P_{out,V02}$, $P_{out,V03}$, ... is calculated for the further vendor V02, V03, ... in accordance with equation [4] and the corresponding intra glass fiber connection is cancelled for this purpose.

$$P_{out,Vx} = \text{Mod}\left\{\frac{P_{out,V01} + P_{in,V01} - P_{in,Vx} - 1}{\#AWG\_ports}\right\} + 1 \quad [4]$$

Figure 4:
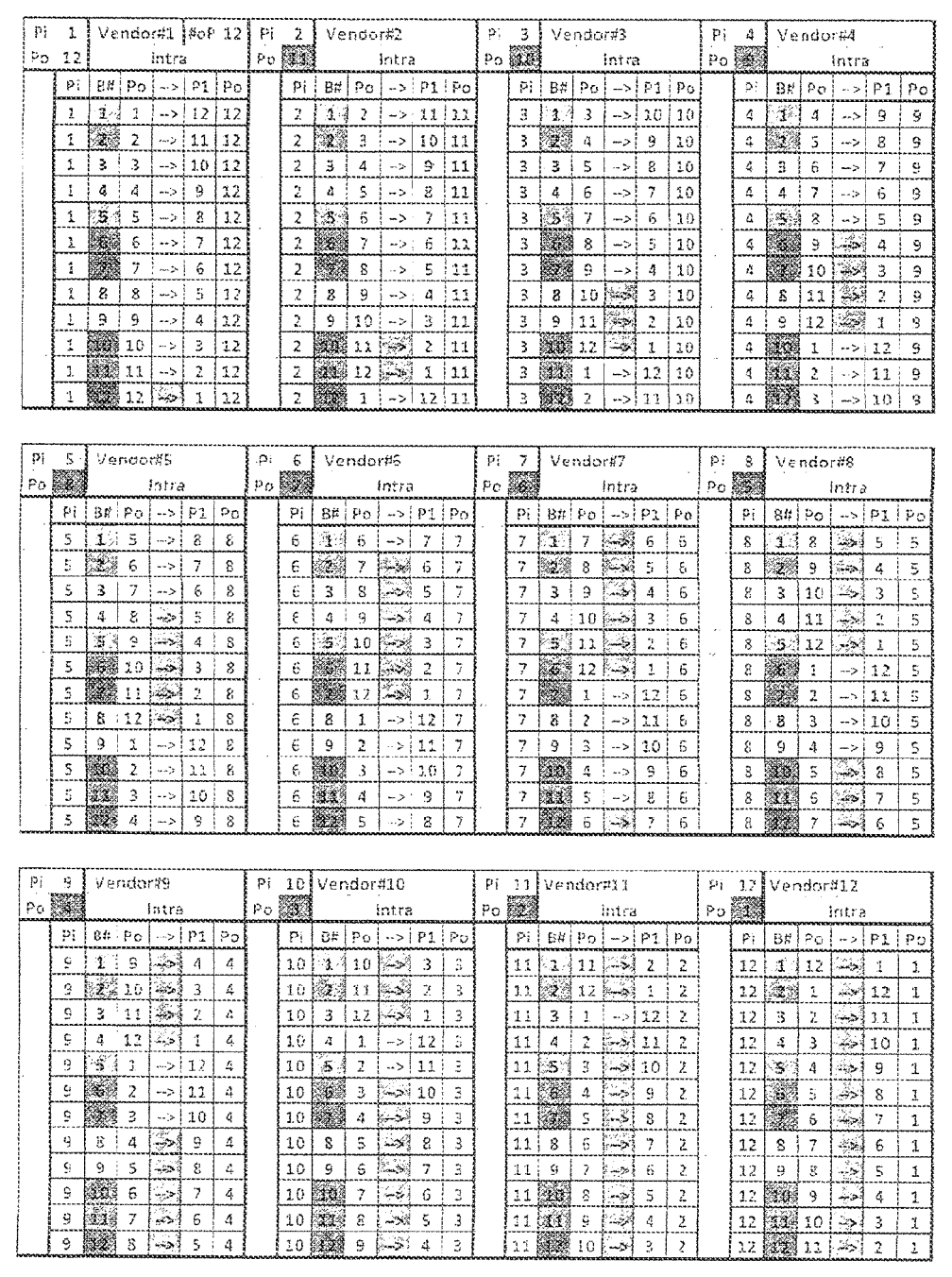

For example, for $P_{in,V01}=1$, $P_{out,V01}=12$, #AWG_ports=12 and $P_{in,V02}=2$, the AWG output port $P_{out,V02}=11$ is obtained for the second vendor V02 (see FIG. 4, partial table, uppermost line, second column)

Further output ports of further connected DWDM systems of further vendors are shown in FIG. 4 for accordingly selected AWG input ports.

6. Steps 4 and 5 are repeated as long as DWDM systems should or can be connected. Up to N DWDM systems can be connected to an N×N AWG. An exemplary connection of up to 12 DWDM systems to, e.g., a 12×12 AWG is shown in FIG. 4.

FIG. 4 should be read such that in the respective vendor-specific blocks Vendor#x in the first column Pi the respective AWG input port $P_{in,Vx}$ is shown.

In the second column B# the channel band numbers of the respective 400 GHz wide bands B# are shown.

In the third column Po, the corresponding AWG output ports are shown depending on the channel band number B#.

In the fourth column, the arrows show the intra glass fiber connections between the corresponding output ports Po in the third column and the input ports Pi in the fifth column. The optimization aim is the guidance of DWDM channels in the own vendor DWDM system. If an arrow in the fourth column is highlighted in gray, this intra glass fiber connection is not possible because the corresponding ports are already occupied by input or output ports of DWDM systems. The more DWDM systems are connected, the lower is the number of intra glass fiber connections, wherein the number is reduced with each additionally connected DWDM system by one connection. In case N DWDM systems are connected to an N×N AWG, an intra glass fiber connection is no longer possible. All DWDM signals pass through the N×N AWG only once so that the corresponding throughput dampening is about 6 dB to 11 dB.

The sixth column shows the vendor-specific AWG output ports, wherein there is only one corresponding output port per vendor because only one fiber can be connected to the corresponding DWDM system.

When connecting different DWDM systems to an N×N AWG, the input and output ports for the first DWDN system can be randomly selected. Further DWDM systems can be connected in accordance with the above-mentioned scheme.

FIG. 5 shows the bidirectional structure for the connection of two DWDM systems to a respective 12×12 AWG per direction, wherein, e.g., AWG ports 1 and 7 are used.

The other ports can be connected to further DWDM systems, or intra glass fiber connections can be connected in accordance with the equations in "equations 3" or the illustration in FIG. 6, wherein this arrangement is valid per direction for the connection shown in FIG. 5.

Intra glass fiber connections can be simultaneously connected per direction between the AWG ports (Pin,Pout) (2,12), (3,11), (4,10), (5,9), (6,8), (8,6), (9,5), (10,4), (11,3) and (12,2), see FIG. 6 for the right vendor V#2 area.

By using two equal N×N AWGs, i.e. one N×N AWG per direction for the bidirectional DWDM systems, these wavelengths can at the same time be used for the back and forth channels of the bidirectional DWDM systems.

Per single mode fiber, DWDM systems can carry 12×400 GHz channel bands with B#=1, 2, ..., 12 in the C band, wherein the bandwidth in the C band is 12×400 GHz=4800 GHz.

According to FIGS. 5 and 6, two DWDM systems 1 and 2 are connected to each other at the respective AWG input and output ports 1 and 7.

The channel band B#=1 of the first DWDM system V01 is guided directly from the AWG input port $P_{in1}$ to the AWG output port $P_{out1}$ of the first DWDM system V01, wherein it is optically dampened by about 6 dB to 11 dB.

The channel band B#=7 of the first DWDM system V01 is guided directly from the AWG input port $P_{in1}$ to the AWG output port $P_{out7}$ of the second DWDM system V02, wherein it is optically dampened by about 6 dB to 11 dB.

The other channel bands B#=2, 3, 4, 5, 6, 8, 9, 10, 11, 12 at the AWG input port $P_{in1}$ of the first DWDM system V01 are guided to the AWG output port $P_{out1}$ of the first DWDM system V01 because of the intra glass fiber connections which are shown, e.g., in FIG. 6 and optimized for the transmission on the own DWDM system. The channel bands pass twice through the 12×12 AWG and are optically dampened by about 2×6 dB to 2×11 dB.

The same functionalities apply to the connection of the counter-directional DWDM signals to the second AWG according to FIG. 5. Corresponding functionalities apply to the input signals of the second DWDM system on the AWG input port $P_{in7}$.

The channel band B#=1 of the second DWDM system V02 is guided directly from the AWG input port $P_{in7}$ to the AWG output port $P_{out7}$ of the second DWDM system V02. It is optically dampened by about 6 dB to 11 dB.

The channel band B#=7 of the second DWDM system V02 is guided directly from the AWG input port $P_{in7}$ to the AWG output port $P_{out1}$ of the first DWDM system V01. It is optically dampened by about 6 dB to 11 dB.

The other channel bands B#=2, 3, 4, 5, 6, 8, 9, 10, 11, 12 at the AWG input port $P_{IN7}$ of the second DWDM system V02 are guided to the AWG output port $P_{out7}$ of the second DWDM system V02 because of the intra glass fiber connections which are shown, e.g., in FIG. 6 and optimized for the transmission on the own DWDM system. The channel bands pass twice through the 12×12 AWG and are optically dampened by about 2×6 dB to 2×11 dB.

The intra glass fiber connection between the AWG input and output ports, which is optimized for the guidance of the DWDM channels to the own DWDM systems, as carried out here, e.g., in accordance with FIG. 6, is not mandatory and can be changed arbitrarily in accordance with the desired connections or transmission paths or other optimization aims.

Figure 7:
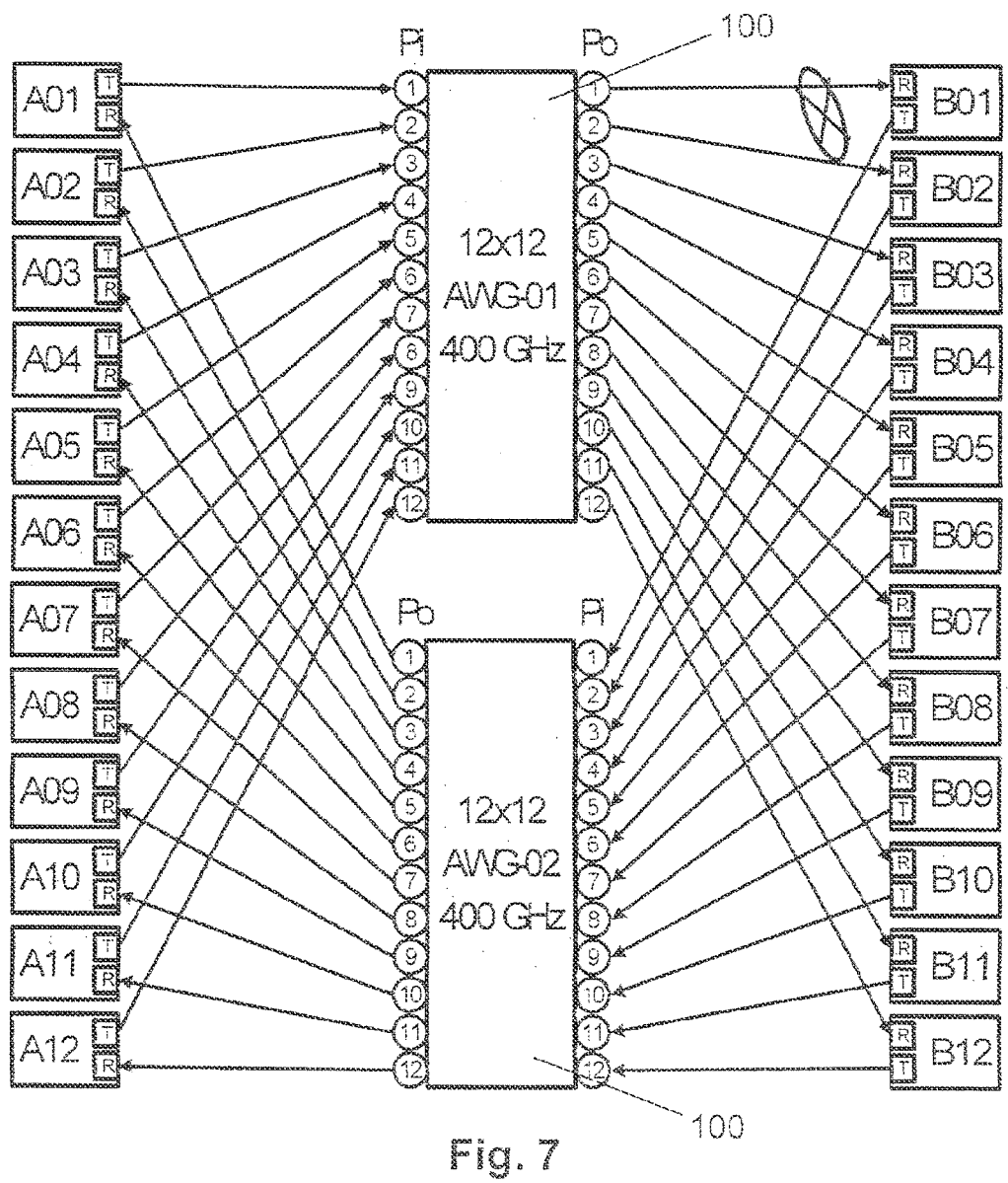
FIG. 7 shows an embodiment for a bidirectional connection of 2×12 DWDM network nodes Ax and By via two 12×12 AWGs with 400 GHz each for the channel bands B# per direction.

In case, e.g., 12 DWDM network nodes A01, A02, . . . , A12 with two 12×12 AWGs are connected bidirectionally to 12 further network nodes B01, B02, . . . , B12 in accordance with FIG. 7, in each case 400 GHz channel bands B# are connected between the respective DWDM network nodes. This leads to a wavelength-meshing between each Ax network node with each By network node as well as each Bx network node with each Ay network node (x=1, 2, . . . , 12) (y=1, 2, . . . , 12) with a channel band B# with the bandwidth of 400 GHz per transmission direction. It is possible to use equal wavelengths for the channel bands B' for the bidirectional connections and thus equal optical wavelengths for the back and forth directions. The invention additionally allows the setup of simple modular network structures with high capacities. The 400 GHz wide channel bands can be extended, e.g., with 100 Gbit/s via 50 GHz wavelength channels in accordance with the necessary transmission capacities.

For the maximum bidirectional transmission capacities, a value of 12×12=144 connections is achieved, each having a bandwidth of 400 GHz per transmission direction. If the spectral efficiency of 2 Bit/s/Hz is assumed, wherein 100 Gbit/s can be transmitted via 50 GHz channels over >3000 km (see, e.g., 9.6 Tbit/s, 96×100 Gbit/s DWDM transmission over 300 km; http://www.cisco.com/en/US/prod/collateral/optical/ps5724/ps2006/data_sheetc78-713296.html), a capacity of 144×400 GHz×2 Bit/s/Hz=115.2 TBit/s is achieved per direction, i.e. a bidirectional capacity of 115.2 TBit/s per direction.

The network architecture according to FIG. 7 can be used for setting up a reliable redundant backbone DWDM network with the possibility of equivalent networks. For this purpose, e.g., N=12 network areas having 2 respective network nodes Ax and Bx (x=1, 2, . . . , N=12) with equal numbers per network area are assumed. Thus, two bidirectional connections each having a bandwidth of 400 GHz per direction are available for the connection of a network area. If a connection is interrupted by an error, as indicated in FIG. 7 for the network node B01, the network node A01 can maintain the traffic to all other network areas to the Bx (x=1, 2, . . . , N=12) network nodes. For this purpose, a further downstream connection between the respective two network nodes Ax and Bx (x=1, 2, . . . , N=12) of an area is necessary.

In the following, some exemplary advantages of the present invention will be summarized briefly.

The invention allows a bidirectional connection of different DWDM systems to different management signals of, e.g., also different vendors via two N×N AWGs. Connections of this kind have not been possible so far.

When connecting the different DWDM systems, the invention allows the still undisturbed management operation of the individual DWDM systems, which do not disturb themselves either. It is still possible to manage respective optical transmission sections (OTS) and optical multiplex sections (OMS) of the vendor-specific DWDM system in an undisturbed manner.

When connecting the DWDM systems, the invention allows the use of the same wavelength channel bands (channels) for the back and forth directions of the bidirectional connections, wherein two equal N×N AWGs are used, one for the back and one for the forth direction.

The invention allows the setup of simple modular core network structures with high capacities. The 400 GHz wide channel bands can be structured modularly, e.g., with 100 Gbit/s via 50 GHz wavelength channels in accordance with the necessary transmission capacities.

The invention allows the transparent optical transmission of "alien wavelength" channels from a DWDM system of a vendor V01 to another DWDM system of another vendor V02 without having to carry out an optical-to-electrical-to-optical conversion in a transponder. It is also possible to connect a plurality of channel bands by intra glass fiber connections, which has not been possible so far but could only be realized in a reconfigurable optical add/drop multiplexer with much more effort.

The invention allows the setup of a reliable backbone network architecture with equivalent networks for N network areas with two respective redundant network nodes Ax and Bx (x=1, 2, . . . , N=12) which are redundantly connected to respective network nodes of the other areas.

Figure 8:
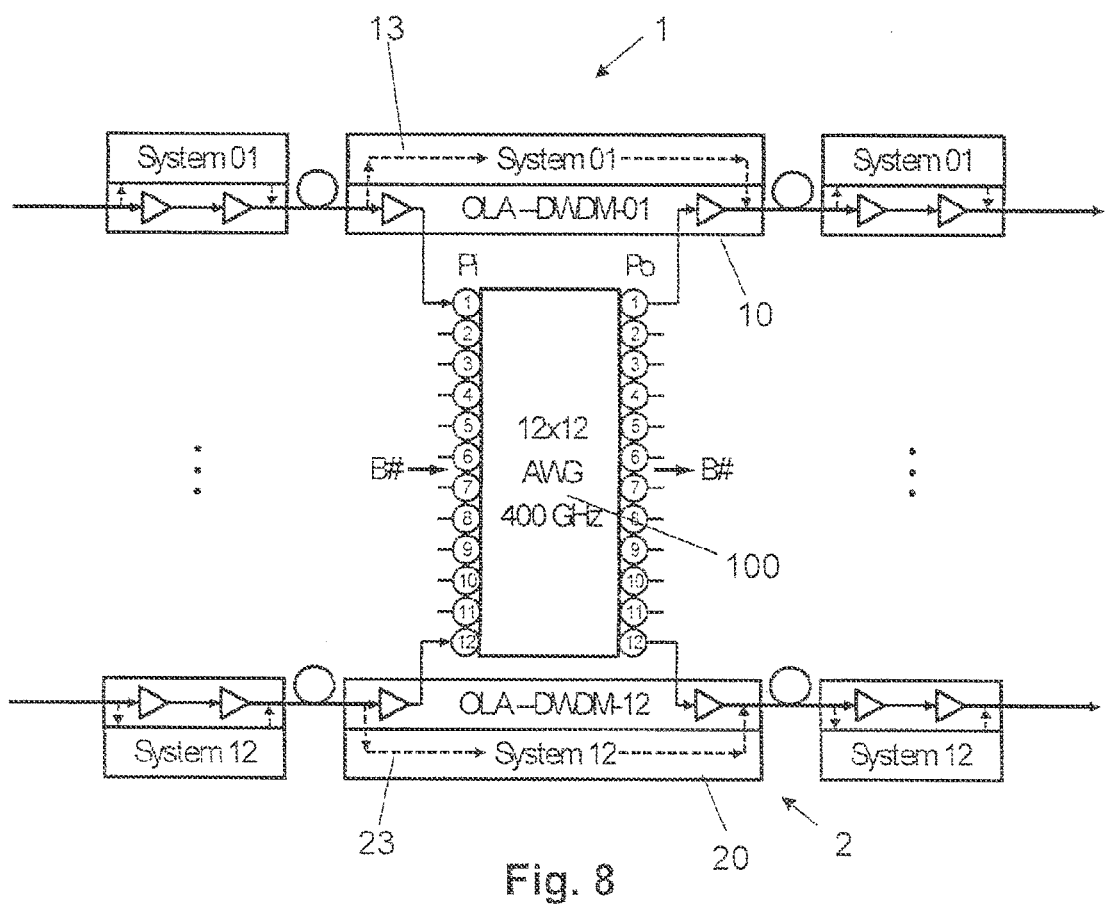
FIG. 8 shows an embodiment with one AWG for a unidirectional system with a management continuation, similar to FIG. 1.

FIG. 8 shows a further embodiment with an AWG for a unidirectional system with a management continuation, similar to that of FIG. 1. In other words, the management signals are continued in the OLA 10, 20, whereas the user data (content signals) are transmitted between different systems by means of AWG 100.

Similar to FIG. 1, only a unidirectional direction is shown here. According to the invention, up to 12 systems can be connected unidirectionally by means of a 12×12 AWG 100. For example, the first system is connected to the input Pi=1 and the output Po=1 and the twelfth system is connected to the input Pi=12 and the output Po=12. Therebetween, further ten systems can be connected, which is shown by the dots.

Figure 9:
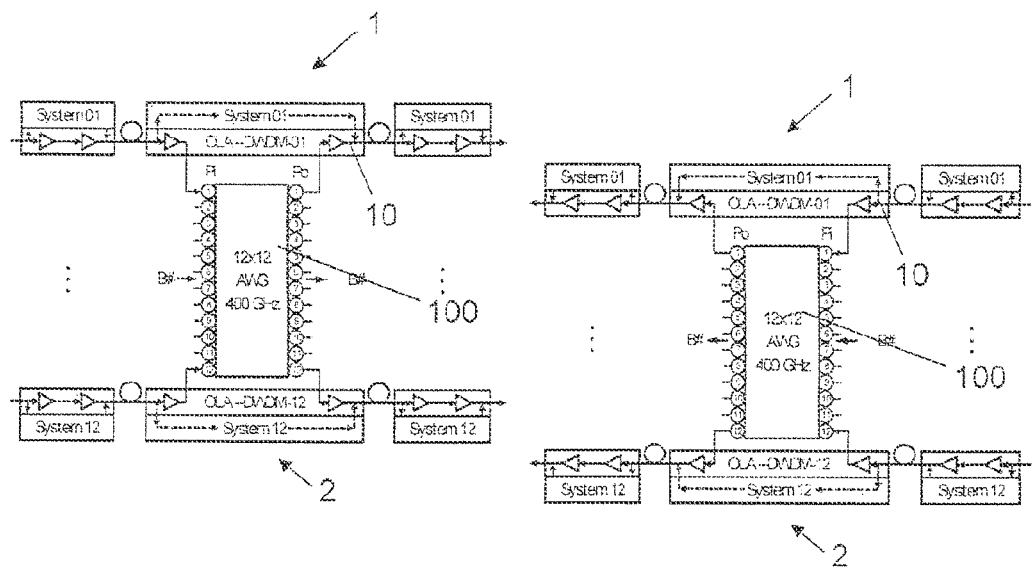
FIG. 9 shows an embodiment with two AWGs for a bidirectional system with management continuation, similar to FIG. 5.

FIG. 9 shows a further embodiment with two AWGs 100 for a bidirectional system with a management continuation similar to that of FIG. 5. In the illustration shown in FIG. 9, however, the two AWGs are offset with respect to each other. In this embodiment, the first AWG at the left serves for the one direction and the second AWG for the counter-direction. In principle, FIG. 9 shows the same as FIG. 8 but separately for the two transmission directions. The maximum number of twelve bidirectionally connected systems is again shown by dots.

Figure 10:
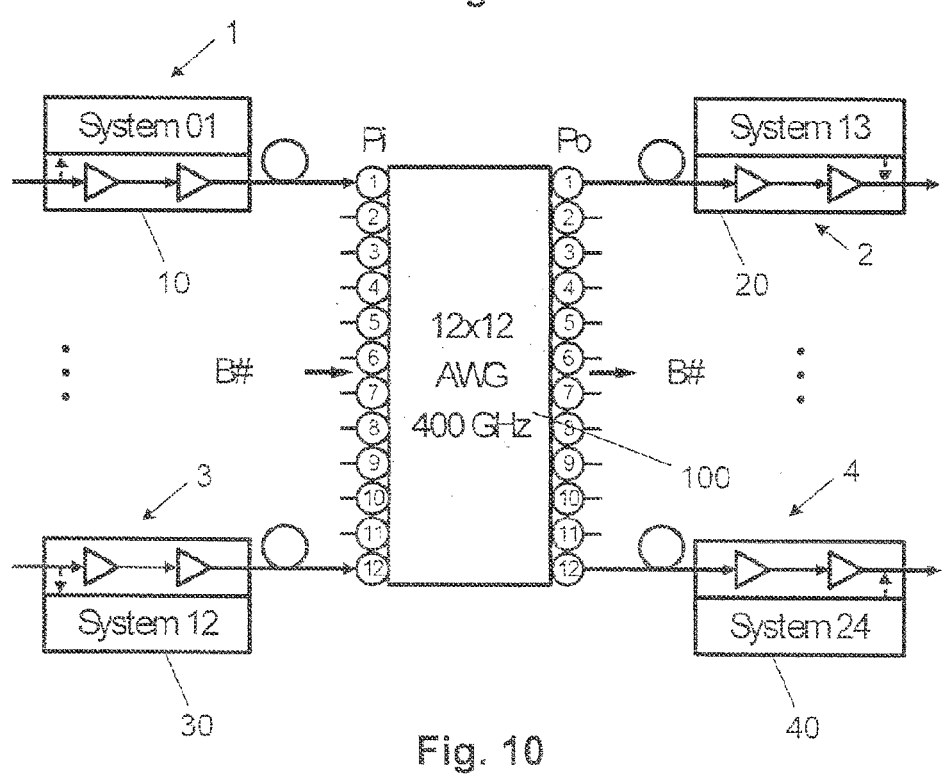
FIG. 10 shows an embodiment with one AWG for a unidirectional system with termination of the management signals.
Figure 11:
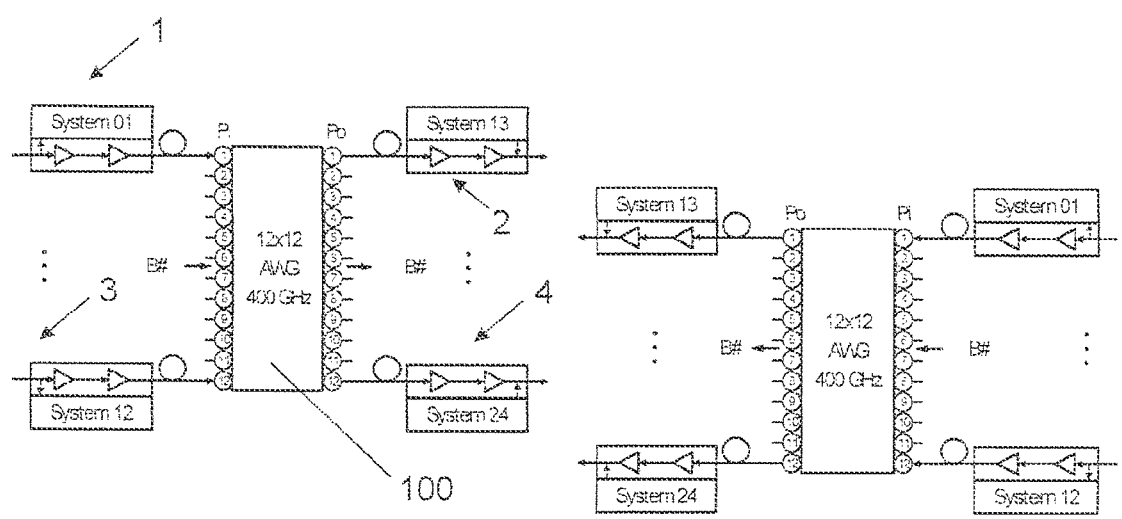
FIG. 11 shows an embodiment with two AWGs for a bidirectional system with termination of the management signals.

FIG. 10 shows a further embodiment with an AWG 100 for a unidirectional system. In contrast to the embodiment of FIG. 8, FIG. 10 shows a unidirectional system without management continuation, so that the number of systems to be coupled is increased to twice the number. For example, by means of a 12×12 AWG, 24 systems can be coupled if the management signals should not be continued and are terminated in the respective systems at the end in the OLA 10, 20, 30 and 40. For example, FIG. 10 shows at the top left the last OLA 10 of a first system, system 1 (system 01), in which, similar to FIG. 1, the management signals of the OSC are decoupled from the content signal upstream of the first amplifier (first triangle), wherein this OSC signal is then terminated in the last OLA 10 of the system 1 so that the OLA 01 of the system 01 only outputs the content signal which is fed in at the input Pi=1. This accordingly also applies to the further systems up to system 3 (system 012), wherein all these systems end at the left side and the respective management signals of the OSC are each terminated in the last OLA. Similar to the embodiments shown above, the AWG 100 only serves for coupling the content signals, wherein it is possible to connect systems 13 to 24 to the respective output ports Po=1 to 12. In other words, the systems 13 to 24 end at the right side to the left or start at this side, so that a continuation of the OSC is not necessary here. Accordingly, only the small arrow after the second amplifier (second triangle) is directed to the content signal, wherein the content signal is then transmitted together with the OSC to the next OLAs (not shown) of the respective systems 13 to 24. A bidirectional connection or a bidirectional system without management continuation is obtained by showing FIG. 10 for the one direction and for the second direction. Accordingly, two 12×12 AWGs are necessary for connecting 24 independent systems bidirectionally with each other (see FIG. 11).

Figure 12:
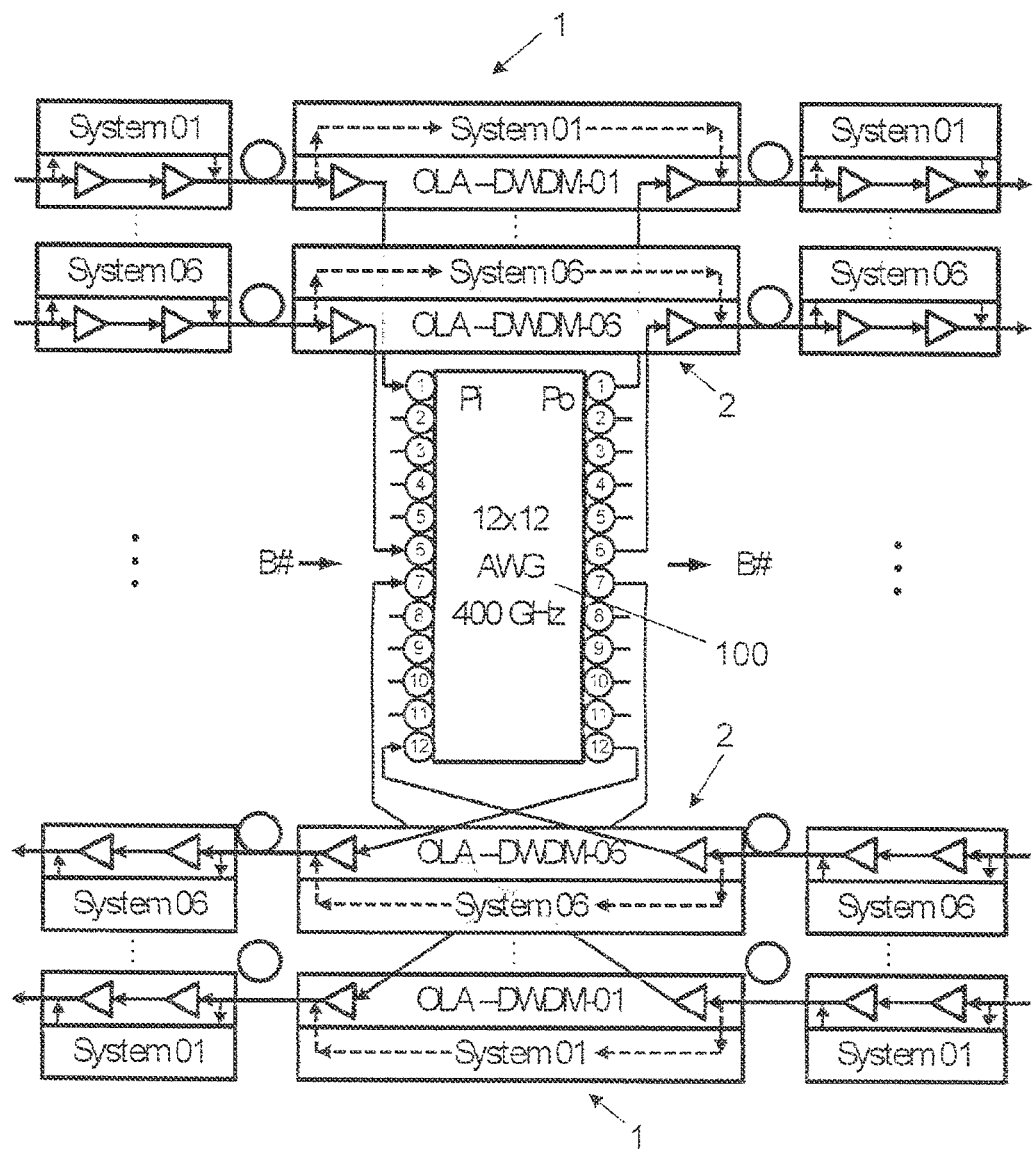
FIG. 12 shows an embodiment with one AWG for a bidirectional system with management continuation.

Finally, FIG. 12 shows a bidirectional system with management continuation comprising only one single AWG 100. Again, a 12×12 AWG 100 is shown by means of which a maximum of six different systems can be coupled or connected bidirectionally. This bidirectional coupling relates to systems in which the management is continued within the respective OLAs, similar to the illustration in FIGS. 2 and 5.

Figure 13:
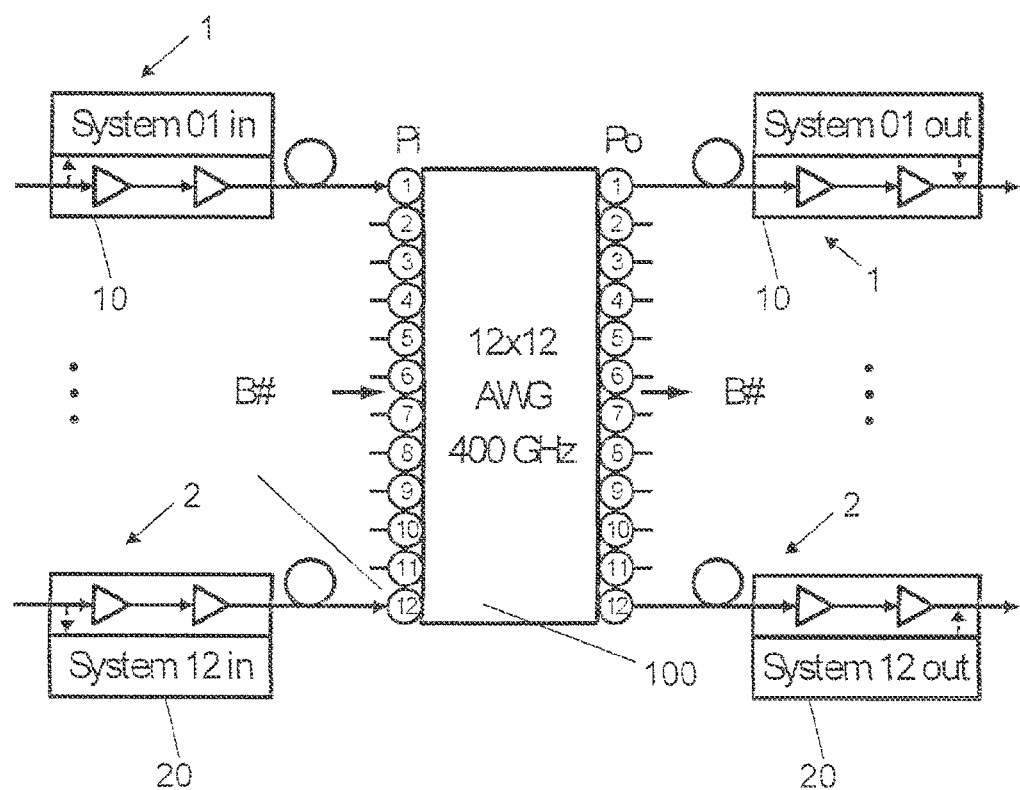
FIG. 13 shows an embodiment with one AWG for a bidirectional system with termination of the management signals.

Finally, FIG. 13 shows a further embodiment of the invention in which twelve systems are bidirectionally possible without management signal continuation by means of an AWG 100. The 12×12 AWG is connected here at the end or at the beginning of the systems 01 to 12 so that a continuation of the management signals is no longer necessary. In this illustration, "system 01 in" means that the system 01 ends at the left side and the content signal from the last OLA 10 of the system 01 is guided into the AWG 100 (Pi). This shows a direction of the systems 01 to 12. The other direction, i.e. the counter-direction, is shown at the right side, wherein at the right side the term "system 01 out" means that this last OLA 10 of the system is connected to the connection Po.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A system, comprising:
  a first dense wavelength division multiplex (DWDM) system; and
  a second DWDM system;
  wherein the first DWDM system includes a first optical line amplifier (OLA) configured to amplify a signal to be transmitted;
  wherein the second DWDM system includes a second OLA configured to amplify a signal to be transmitted;
  wherein the first OLA and the second OLA are connected with each other via a passive N×N arrayed waveguide grating (AWG);
  wherein the first OLA includes a first signal input and a first signal output;
  wherein the first OLA is configured such that a first optical supervisory channel (OSC), including first management signals, is decoupled from a first content signal, downstream of the first signal input;
  wherein the first OSC is coupled to the first content signal, upstream of the first signal output;
  wherein the second OLA includes a second signal input and a second signal output;
  wherein the second OLA is configured such that a second OSC, including second management signals, is decoupled from a second content signal, downstream of the second signal input;
  wherein the second OSC is coupled to the second content signal, upstream of the second signal output;
  wherein the AWG is connected to the first OLA and the second OLA such that the first and second content signals are guided to inputs of the N×N AWG;
  wherein content signals are guided from outputs of the N×N AWG to the first OLA and the second OLA; and
  wherein the content signals in the first OLA and the second OLA are coupled upstream of the respective signal output to the corresponding OSC.

2. The system of claim 1, wherein the first and/or the second OLA is a two-step amplifier.

3. The system of claim 1, wherein the first and/or the second OLA includes two amplifiers, configured such that
  (i) a first amplifier in the first or second OLA amplifies the first or second content signal before further transmission to the N×N AWG, and
  (ii) a second amplifier in the first or second OLA amplifies the first or second content signal after receipt of the content signals from the N×N AWG and before coupling with the OSC.

4. The system of claim 1, wherein the first management signals of the first OSC differ from the second management signals of the second OSC.

5. The system of claim 4, wherein the first management signals are first proprietary signals which differ from second proprietary signals of the second management signals such that the first DWDM system and the second DWDM system belong to different management systems.

6. The system of claim 1, wherein
  (i) in the N×N AWG, a number, N, is a number of ports and a natural number from the following set: 1, 2, 3, 12, 96, 192, 384, >1000 and/or
  (ii) in case N=12, 400 GHz can be guided per port,
  (iii) in case N=96, 50 GHz can be guided per port,
  (iv) in case N=192, 25 GHz can be guided per port,
  (v) in case N=384, 12.5 GHz can be guided per port.

7. The system of claim 6, wherein, up to N, with N=1, 2, 3, >1000, DWDM systems are accordingly connected via N×N ports of the AWG.

8. The system of claim 7, wherein the N×N AWG allows a wavelength-addressed connection of the up to N DWDM systems.

9. The system of claim 1, wherein, for a bidirectional signal transmission, the first DWDM system is connected to the second DWDM system via two passive N×N AWGs.

10. The system of claim 1, wherein up to N DWDM systems are connected bidirectionally via an N×N AWG.

11. The system of claim 1, wherein the first DWDM system and the second DWDM system are connected and configured for a unidirectional signal transmission.

12. The system of claim 1, wherein the AWG is connected to the first OLA and the second OLA such that the first and second optical supervisory channels are not guided to inputs of the N×N AWG.

13. A method for connecting a first dense wavelength division multiplex (DWDM) system to a second DWDM system, the first DWDM system including a first optical line amplifier (OLA) configured to amplify a signal to be transmitted, and the second DWDM system including a second OLA configured to amplify a signal to be transmitted, the method comprising:
connecting the first OLA to the second OLA using a passive N×N arrayed waveguide grating (AWG);
wherein the first OLA includes a first signal input and a first signal output;
wherein the first OLA is configured such that a first optical supervisory channel (OSC), including first management signals, is decoupled from a first content signal, downstream of the first signal input;
wherein the first OSC is coupled to the first content signal, upstream of the first signal output;
wherein the second OLA includes a second signal input and a second signal output;
wherein the second OLA is configured such that a second OSC, including second management signals, is decoupled from a second content signal, downstream of the second signal input;
wherein the second OSC is coupled to the second content signal, upstream of the second signal output;
wherein the AWG is connected to the first OLA and the second OLA such that the first and second content signals are guided to inputs of the N×N AWG;
wherein content signals are guided from outputs of the N×N AWG to the first OLA and the second OLA; and
wherein the content signals in the first OLA and the second OLA are coupled upstream of the respective signal output to the corresponding OSC.

14. The method of claim 13, wherein the connection is configured for a unidirectional signal transmission.

15. The method of claim 13, wherein the first and/or the second OLA is a one-step or a two-step OLA.

16. A system, comprising:
a first dense wavelength division multiplex (DWDM) system; and
a second DWDM system,
wherein the first DWDM system includes a first optical line amplifier (OLA) configured to amplify a signal to be transmitted, wherein the first OLA includes a first signal input and a first signal output, and wherein the first OLA is configured such that a first optical supervisory channel (OSC), including first management signals, is decoupled from a first content signal, downstream of the first signal input,
wherein the second DWDM system includes a second OLA configured to amplify a signal to be transmitted, wherein the second OLA includes a second signal input and a second signal output, and wherein the second OLA is configured such that a second OSC, including second management signals, is decoupled from a second content signal, downstream of the second signal input;
wherein the first OLA and the second OLA are connected with each other via a passive N×N arrayed waveguide grating (AWG), and
wherein the first management signals of the first OSC differ from the second management signals of the second OSC.

* * * * *